US012765973B2

(12) United States Patent
Brinkmeier

(10) Patent No.: US 12,765,973 B2
(45) Date of Patent: Oct. 20, 2026

(54) JAW IMPLANT

(71) Applicant: Joachim Brinkmeier, Merzhausen (DE)

(72) Inventor: Joachim Brinkmeier, Merzhausen (DE)

( * ) Notice: Subject to any disclaimer, the term of this patent is extended or adjusted under 35 U.S.C. 154(b) by 424 days.

(21) Appl. No.: 18/037,115

(22) PCT Filed: Nov. 15, 2021

(86) PCT No.: PCT/EP2021/081713
§ 371 (c)(1),
(2) Date: May 16, 2023

(87) PCT Pub. No.: WO2022/106364
PCT Pub. Date: May 27, 2022

(65) Prior Publication Data

US 2024/0016583 A1 Jan. 18, 2024

(30) Foreign Application Priority Data

Nov. 17, 2020 (DE) ......................... 102020130333.5

(51) Int. Cl.
*A61C 8/00* (2006.01)

(52) U.S. Cl.
CPC .......... *A61C 8/0031* (2013.01); *A61C 8/0012* (2013.01); *A61C 8/003* (2013.01); *A61C 8/0095* (2013.01); *A61C 2201/00* (2013.01)

(58) Field of Classification Search
CPC .. A61C 8/0031; A61C 8/0095; A61B 17/8071
See application file for complete search history.

(56) References Cited

U.S. PATENT DOCUMENTS

| | | | | | |
|---|---|---|---|---|---|
| 3,003,802 | A | | 10/1961 | Wilson | |
| 4,713,004 | A | * | 12/1987 | Linkow | A61C 8/0069 433/174 |
| 5,052,930 | A | * | 10/1991 | Lodde | A61C 8/0031 433/176 |
| 5,076,623 | A | | 12/1991 | Richards | |
| 5,133,662 | A | * | 7/1992 | Metcalfe | A61C 8/0048 433/172 |
| 5,306,150 | A | * | 4/1994 | Gittleman | A61F 2/3662 433/176 |

(Continued)

FOREIGN PATENT DOCUMENTS

| | | | | | |
|---|---|---|---|---|---|
| CN | 106175903 | A | * | 12/2016 | A61B 17/8071 |
| DE | 1075791 | | | 2/1960 | |

(Continued)

*Primary Examiner* — Heidi M Eide
(74) *Attorney, Agent, or Firm* — Volpe Koenig

(57) ABSTRACT

A jaw implant (1) having at least one approximately U-shaped hole strip (2), which carries fixing holes (3) spaced apart from one another. In the jaw implant (1), in the space between adjacent fixing holes (3) there are provided cross-sectional weaknesses (4) for cutting the at least one hole strip (2) to length. The at least one hole strip (2) has, in a partial region (8) situated at a distance from the free ends (6, 7) of this hole strip (2), in the region of every fixing hole (3) having an internal screw thread for fixing a dental prosthesis, a cross-sectional widening (9) which increases the longitudinal extension of this fixing hole (3).

8 Claims, 9 Drawing Sheets

(56) References Cited

U.S. PATENT DOCUMENTS

| | | | | | |
|---|---|---|---|---|---|
| 5,419,701 | A * | 5/1995 | Propper | A61C 8/0009 | 433/173 |
| 5,485,733 | A | 1/1996 | Hoffman | | |
| 5,769,637 | A * | 6/1998 | Morgan | A61F 2/2846 | 433/176 |
| 2003/0232308 | A1* | 12/2003 | Simmons, Jr. | A61C 8/0031 | 433/173 |
| 2005/0182408 | A1* | 8/2005 | Pfefferle | A61B 17/8085 | 606/285 |
| 2007/0134623 | A1* | 6/2007 | Essiger | A61F 2/2846 | 433/173 |
| 2008/0015593 | A1* | 1/2008 | Pfefferle | A61B 17/8052 | 606/282 |
| 2008/0081315 | A1* | 4/2008 | Kim | A61B 17/8071 | 433/173 |
| 2010/0069973 | A1 | 3/2010 | Castaneda et al. | | |
| 2014/0248583 | A1* | 9/2014 | Rostami | A61C 8/0025 | 433/173 |
| 2016/0120582 | A1* | 5/2016 | Martinez Navarro | A61C 8/0022 | 433/169 |
| 2018/0161129 | A1* | 6/2018 | Mommaerts | A61C 8/0031 | |
| 2019/0257121 | A1 | 8/2019 | Tubby et al. | | |
| 2020/0261189 | A1* | 8/2020 | Waizenegger | A61C 8/0031 | |
| 2020/0345399 | A1* | 11/2020 | Gregory, II | A61B 50/30 | |
| 2022/0015871 | A1* | 1/2022 | Atkinson | A61C 8/0054 | |

FOREIGN PATENT DOCUMENTS

| | | | | |
|---|---|---|---|---|
| DE | 3613951 | A1 * | 11/1987 | |
| DE | 19936061 | | 3/2000 | |
| DE | 102015122800 | | 5/2017 | |
| KR | 200387413 | Y1 | 6/2005 | |
| WO | WO-0006044 | A1 * | 2/2000 | A61C 8/0031 |
| WO | WO-0193775 | A1 * | 12/2001 | A61B 17/8071 |
| WO | WO-2011078475 | A2 * | 6/2011 | A61C 8/0031 |
| WO | 2012016920 | A1 | 2/2012 | |
| WO | 2016201580 | | 12/2016 | |
| WO | 2017174403 | | 10/2017 | |

* cited by examiner

JAW IMPLANT

CROSS-REFERENCE TO RELATED APPLICATIONS

This application is the U.S. National Phase of PCT Appln. No. PCT/EP2020/081713, filed Nov. 15, 2021, which claims priority to German Patent Application No. 10 2020 130 333.5, filed Nov. 17, 2020, the entire disclosures of which are incorporated by reference herein.

TECHNICAL FIELD

The invention relates to a jaw implant having at least one approximately U-shaped hole strip carrying fixing holes which are spaced apart from each other.

BACKGROUND

From DE 10 2015 122 800 B3 there is already known a jaw implant having a carrier structure, which has at least one mounting section following the bone outer structure, which can be screwed firmly to a jaw bone. At least one base protrudes far out on the mounting section, being intended to receive a prosthesis directly or by using an intermediate part also known as an abutment. Since the already known jaw implant with its far protruding bases on the mounting section constitutes a three-dimensional structure, an individual fabrication and adapting of the known jaw implant is necessary for each individual patient. For this, the known jaw implant is produced in a method calling for the acquisition of individual patient data in a first method step, regarding for example the configuration of the bones and soft tissues of the patient as well as the particular outer contour in the region of the jaw by using a MRT or CT, before the carrier structure with the protruding bases is made on the basis of this individual patient data by means of CAD or CAM technology, preferably making use of a laser sintering manufacture.

Since the jaw implant already known from DE 10 2015 122 800 B3 constitutes a person-specific implant which first needs to be produced in a costly manner, the use of the prior art known from DE 10 2015 122 800 B3 constitutes a considerable burden for the patient. The patient, who is often elderly, sick, or suffering from a tumor, must at first be assisted with a temporary measure which should not be stressed, while the implant produced according to 10 2015 122 800 B3 is available to him only at a later date. Since the remaining length of life may be short, especially for sick people, this procedure with the known implant constitutes a considerable burden for the patient.

SUMMARY

Therefore, the object is to create a jaw implant with which an upper or lower jaw having at least one gap in the region of the teeth and possibly also the jaw bone can be treated, where the jaw implant according to the invention should make possible a quick and short-term treatment that restores the load bearing capacity of the jaw immediately after the treatment. Another object is to create a treatment which ensures, with the aid of such a jaw implant, that the function of the jaw and its load bearing capacity can be quickly restored after the treatment. The jaw implant according to the invention and the corresponding treatment method should be equally suitable for humans and animals in need of treatment.

The solution to this object according to the invention is provided by a jaw implant having one or more of the features disclosed herein.

The jaw implant according to the invention comprises at least one U-shaped hole strip, which carries fixing holes spaced apart from one another, being provided for the mounting of the jaw implant on the jaw bone of the patient and additionally or alternatively for fastening a dental prosthesis. In the space between adjacent fixing holes, cross-sectional weaknesses are provided, facilitating a deformation following the bone outer structure and an adapting of the shape of the at least one hole strip, and also intended for cutting the at least one hole strip to length. Since the hole strip when needed can be cut to length at the cross-sectional weaknesses, the jaw implant according to the invention can be manufactured in series or even in large industrial lots and then be adapted to the individual circumstances in the region of the jaw being treated, even during only one treatment session. While the fixing holes provided at the free end regions of the approximately U-shaped hole strip can be provided only for the fixation and screwing tight of the jaw implant to the jaw bone, the hole strip has, in a partial region situated at a distance from the free ends of this hole strip, in the region of every fixing hole having an internal screw thread, a cross-sectional widening which increases the longitudinal extension of this fixing hole. Thanks to these cross-sectional widenings in the region of the partial region of the hole strip carrying the dental prosthesis, the dental prosthesis can be screwed firmly and capable of bearing stress to the hole strip, without requiring a protruding mounting base, peg, or sleeve.

A preferred modification, in which the at least one hole strip if necessary can be easily deformed and/or cut to length at the waist-like cross-sectional weaknesses, calls for the at least one hole strip to form an interior first hole strip, which is joined at least on one side and preferably on both sides by connection webs to at least one exterior second hole strip.

The jaw implant according to the invention can have a single, likewise U-shaped second hole strip, which bounds the interior first hole strip and is joined to it by connection webs. Preferable, however, is an embodiment in which the interior first hole strip is joined on both sides to a respective exterior second hole strip.

A preferred modification, in which the first and/or second hole strip if necessary can be easily deformed and/or cut to length at the waist-like cross-sectional weaknesses, calls for the first and/or the second hole strip to have a link chain-shaped outer contour having in each case a preferably rounded bulging situated in the region of every fixing hole and a waist-like indentation fashioned as a cross-sectional weakness between adjacent fixing holes.

In order for the dental prosthesis to be mounted firm against rotation at the fixing hole provided in the region of a cross-sectional widening, it is advantageous for the cross-sectional widenings to have a non-round outer contour.

An embodiment is preferred in which at least one cross-sectional widening takes the form of a material thickening of the first interior hole strip provided on one side or both sides, which material thickening has a preferably circle segment-shaped outer contour with outer lines or circle chords arranged on opposite sides toward adjacent cross-sectional widenings.

In order to fabricate the jaw implant according to the invention in a simple manner and adapt it easily to the individual circumstances of a patient during a treatment, it is advantageous for the first and/or the second hole strip to be formed without a base, peg, or sleeve especially in the area of the cross-sectional widenings.

An especially advantageous modification according to the invention calls for the first and/or the second hole strip to have a reduced strip cross section in a middle region of their longitudinal extension and a comparatively thickened or enlarged strip cross section in the direction of their free end regions. Thanks to this also dogbone-shaped strip cross section, the hole strips of the jaw implant according to the invention lie against the jaw of the patient only in the region of the free strip ends, while by way of contrast the other and especially the middle partial regions of the jaw are less heavily stressed so that they continue to have an adequate blood supply.

In order to adjust the force exerted by means of the fastening screws for the fastening of the jaw implant on the jaw, and to avoid too strong a fastening of the jaw implant to the jaw, it is advantageous for the fixing holes provided at the free end regions of the first hole strip and intended for the fastening of the first hole strip to the jaw to also carry an internal screw thread.

The fabrication of the jaw implant according to the invention and its adapting to the individual circumstances of a patient is improved if the second hole strip(s) is/are adapted to the shape of the U-shaped interior first hole strip.

In order also to use only the first interior hole strip of the jaw implant according to the invention when necessary or to fasten it only to the second hole strip connected on one of the two lengthwise sides of the first interior hole strip, it is advantageous for the jaw implant to be designed to be able to be cut to length and/or to be deformable in the region of its connection webs.

One preferred embodiment according to the invention calls for the jaw implant in the region of its connection webs to be designed to be deformable, such that the interior first hole strip can be mounted on the jaw ridge, while the exterior second hole strip(s) can be fastened to the adjacent outer flank of the jaw.

The jaw implant according to the invention can be easily made from metal or some other suitable material. Advantageously, the jaw implant is made from a preferably reinforced and especially fiber-reinforced plastic.

The invention also relates to a method for the treatment of a jaw having at least one gap in the region of the teeth and possibly also the jaw bone by means of a jaw implant of the aforementioned kind, which jaw implant is cut to length and/or separated at a partial region of the at least one hole strip adapted to the at least one gap, and in a following step of the method the dental prosthesis is mounted on the partial region bridging over the at least one gap.

BRIEF DESCRIPTION OF THE DRAWINGS

Modifications according to the invention will emerge from the following description of preferred exemplary embodiments in connection with the claims as well as the drawing. The invention shall be described more closely in the following with the aid of preferred exemplary embodiments.

There are shown.

DETAILED DESCRIPTION

Figure 1:
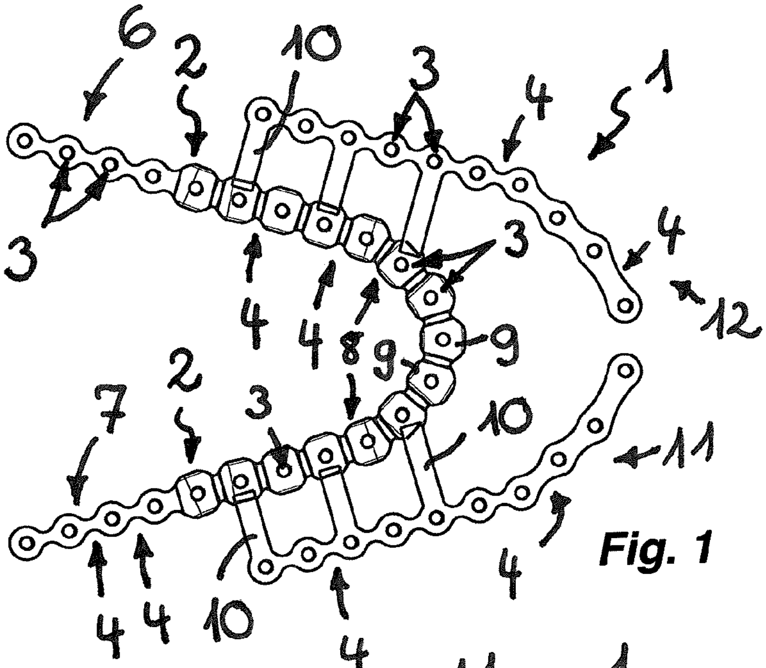
FIG. 1 a jaw implant prefabricated at the factory and shown in a top view, comprising an interior first hole strip for fastening a dental prosthesis as well as a second exterior hole strip on both lengthwise sides, the first hole strip being joined to the second hole strip in each case by connection webs which are deformable and/or which can be cut to length, FIG. 2 the jaw implant of FIG. 1 in a side view, FIG. 3 the jaw implant of FIGS. 1 and 2 in a bottom view, FIG. 4 the jaw implant already presented in FIGS. 1 to 3 in a state cut to length and adapted in shape to an individual jaw, FIG. 5 the jaw implant of FIGS. 1 to 3 in a state adapted in shape to the individual circumstances of a jaw, the jaw having on one half side a gap in the row of teeth and in the jaw bone, which can be bridged with the aid of a partial piece of the jaw implant appropriately cut to length and supplemented with a dental prosthesis not otherwise shown here, FIG. 6 the jaw implant of FIGS. 1 to 3 in a perspective representation, indicating by individual short lines where and how the factory-prefabricated jaw implant can be cut to length to adapt to a particular jaw, FIG. 7 a partial section of the interior first hole strip cut to length from the prefabricated jaw implant per FIGS. 1 to 3, FIG. 8 another partial region of the interior first hole strip cut to length from the jaw implant also prefabricated in large lot numbers according to FIGS. 1 to 3 in a perspective representation, FIG. 9 a partial region made from the prefabricated jaw implant of FIGS. 1 to 3 and already adapted in shape to the jaw of a patient, here bridging a gap in the jaw bone, where the required dental prosthesis can be fastened on the corresponding segment of the interior first hole strip, FIG. 10 the jaw implant from FIGS. 1 to 3, showing by dashed cutting lines and rounded arrows how the hole strips of this jaw implant can be deformed and are adapted to the individual circumstances of a patient, FIG. 11 a partial piece of the interior first hole strip and one of the exterior second hole strips cut to length from the prefabricated jaw implant of FIGS. 1 to 3, FIG. 12 the partial piece from FIG. 11 adapted in shape to a gap in the jaw bone in a perspective representation looking from below, and FIG. 13 the partial piece from FIGS. 11 and 12 in a state fixed to the jaw.

The jaw implant 1 shown here comprises an interior first hole strip 2, having an approximate U shape. The hole strip 2 has fixing holes 3 which are spaced apart and intended for mounting the jaw implant 1 on the jaw bone of the patient and in addition or alternatively for fastening a dental prosthesis. In the space between adjacent fixing holes 3 there are provided cross-sectional weaknesses 4, facilitating a deformation following the bone outer structure and an adapting of the shape of the interior first hole strip 2 and also intended for cutting this hole strip 2 to length. Since the hole strip 2 when needed can be cut to length at the cross-sectional weaknesses 4, the jaw implant 1 can be manufactured in series or even in large industrial lots and then be adapted to the individual circumstances in the area of the jaw 5 being treated, even during only a single treatment session. While the fixing holes 3 provided at the free end regions 6, 7 of the approximately U-shaped interior hole strip 2 can be provided only for the fixation and screwing tight of the jaw implant 1 to the jaw bone, the interior first hole strip 2 has, in a partial region 8 situated at a distance from the free ends 6, 7 of this hole strip 2, in the region of every fixing hole 3 having an internal screw thread for fastening a dental prosthesis, a cross-sectional widening 9 which increases the longitudinal extension of this fixing hole 3.

Figure 2:
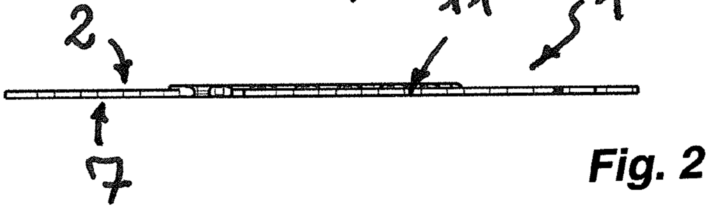
Figure 3:
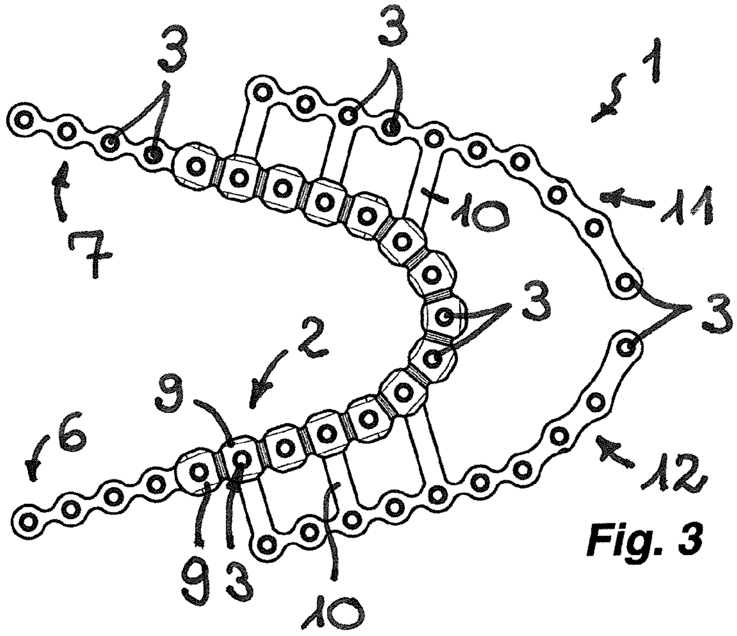

As becomes clear from a comparison of FIGS. 1 to 3, the interior first hole strip 2 is joined on both sides by connection webs 10 to a respective exterior second hole strip 11, 12. The first hole strip 2 and the second hole strips 11, 12 have a link chain-shaped outer contour having in each case a rounded bulging in the region of every fixing hole 3 and a waist-like indentation fashioned as a cross-sectional weakness 4 between adjacent fixing holes 3.

In FIGS. 1 and 3 it can be seen that the cross-sectional widenings 9 have a non-round outer contour, so that a dental prosthesis screwed onto these cross-sectional widenings 9 can be mounted easily thereon and fixed against rotation.

From a comparison of FIGS. 1 and 3, which show the top and bottom of the prefabricated jaw implant 1, it can be seen that the cross-sectional widenings 9 are formed each time as a material thickening of the interior first hole strip 2 provided on both sides, which material thickenings have a preferably circle segment-shaped outer contour with outer lines or circular chords arranged on opposite sides toward adjacent cross-sectional widenings. From the side view in FIG. 2 it can be seen that the jaw implant and its first as well as second hole strip are formed without a base, peg, or sleeve especially in the region of the cross-sectional widenings 9. Furthermore, it becomes clear from FIGS. 1 and 3 that the prefabricated jaw implant 1 is identical in form on the top and bottom and thus can be applied by either the bottom or the top to the jaw 5 and secured there.

It is not shown in FIG. 2 that the first hole strip 2 and/or the second hole strips 11, 12 can have a reduced strip cross section in a middle region of the longitudinal extension and can have a comparatively thickened or enlarged strip cross section in the direction of their free end regions. Thanks to such a dogbone-shaped strip cross section, the interior first hole strip 2 and/or the exterior second hole strip(s) 11, 12 lie against the jaw 5 only by the outer marginal regions of this cross-sectional shape, so that partial regions of the jaw 5 beneath the hole strips 2, 11, 12 are less heavily stressed and they continue to have an adequate blood supply. In FIGS. 1 and 3 it is indicated that the fixing holes 3 provided at the free end regions 6, 7 of the first hole strip 2 and intended for the fastening of the hole strip 2 to the jaw 5 also carry an internal screw thread. Furthermore, such an internal screw thread is also provided in each of the fixing holes 3 provided on one of the second hole strips 11, 12.

As can be seen from FIGS. 1 to 3, the second hole strips 11, 12 are adapted in shape to the shape of the U-shaped interior first hole strip 2 and likewise have a rounded shape in longitudinal extension. The jaw implant 1 can thus be cut to length and is deformable in the region of its connection webs 10.

From a joint consideration of FIGS. 4, 5, 9 and 12 it becomes clear that the jaw implant 1 can be deformed in the region of its connection webs 10 such that the interior first hole strip 2 can be mounted on the jaw ridge, while the exterior second hole strip(s) 11, 12 can be fastened to the outer flanks of the jaw 5.

Figure 4:
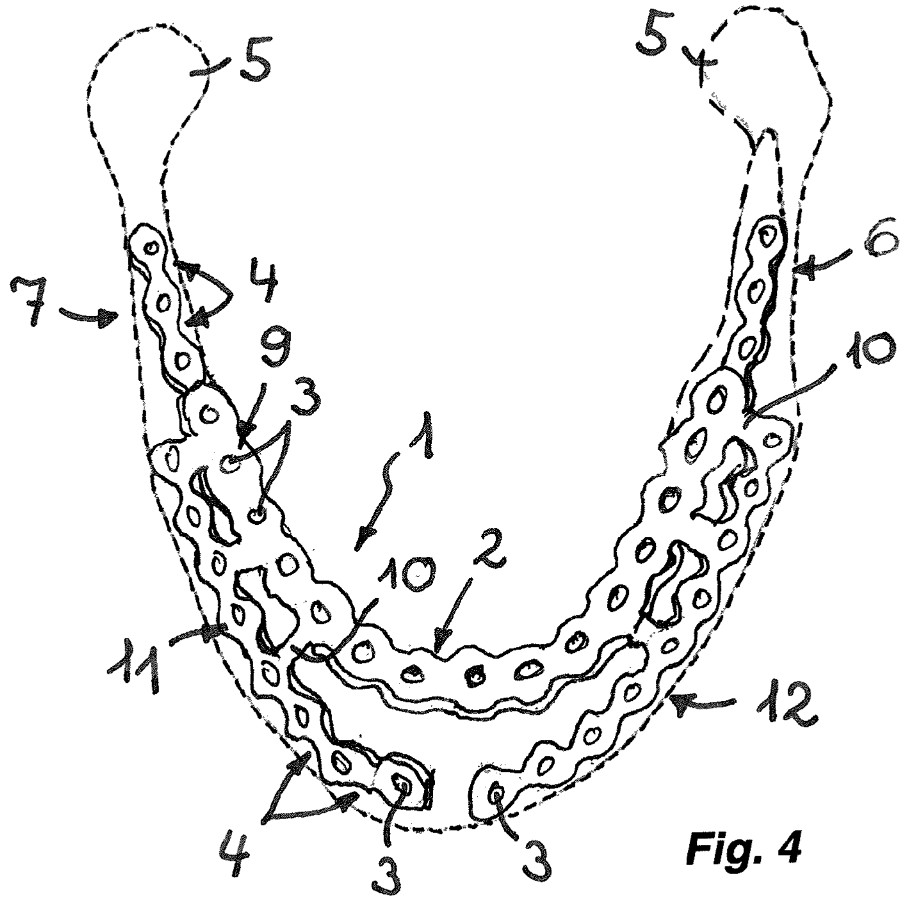

In FIG. 4 it is shown that the jaw implant 1 of FIGS. 1 to 3, likewise prefabricated in large lot numbers, can be deformed such that its first interior hole strip 2 is fixed on the jaw ridge of the jaw 5 being treated, while by way of contrast the second hole strips 11, 12 joined by the downward angled connection webs 10 can be fastened to the outer flanks of the jaw 5. The required dental prosthesis can be screwed at the fixing holes 3 of the interior first hole strip 2, reinforced by corresponding cross-sectional widenings 9. At least some of the fixing holes 3 provided in the region of such cross-sectional widenings 9 can also be used for fastening the interior first hole strip 2 to the ridge of the jaw 5, if corresponding fastening screws are screwed into the jaw bone through these fixing holes 3.

Figure 5:
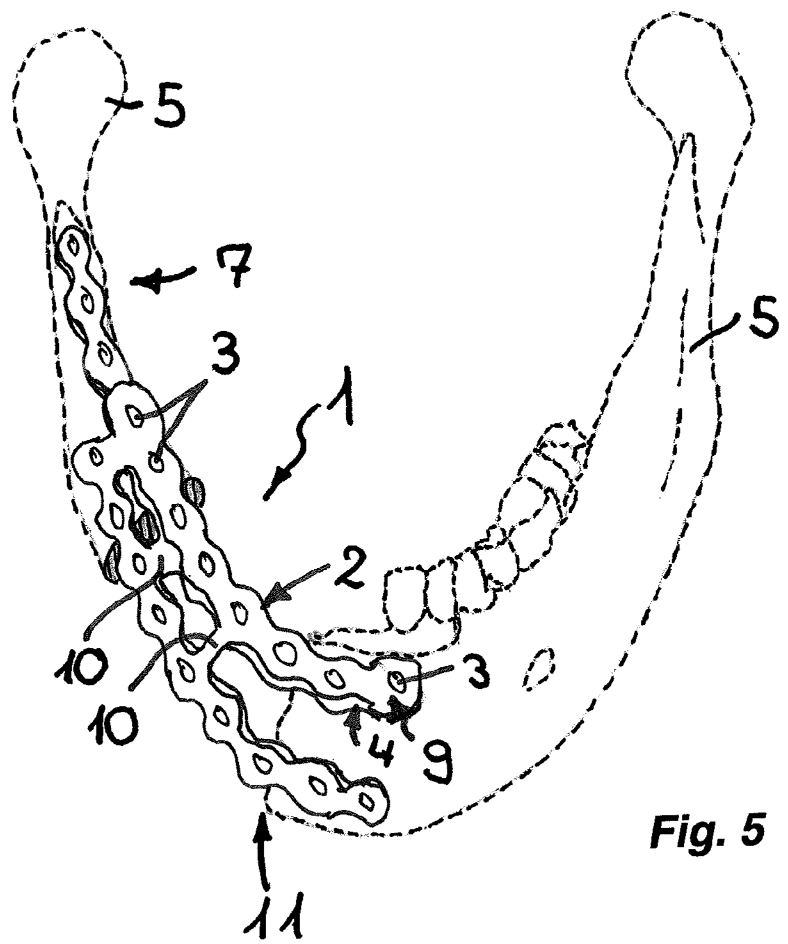

FIG. 5 shows that the prefabricated jaw implant 1 shown in FIGS. 1 to 3 can also be shortened along its longitudinal center axis such that half of the interior first hole strip 2 can be fastened on the corresponding half of the jaw ridge of the jaw 5 being treated, while by way of contrast the second hole strip 11 joined to this hole strip half by the connection webs 10 is screwed firmly to the adjacent outer flank of the jaw 5. Here as well, the fixing holes 3 provided in the region of the cross-sectional widenings 9 can carry the required dental prosthesis.

Figure 6:
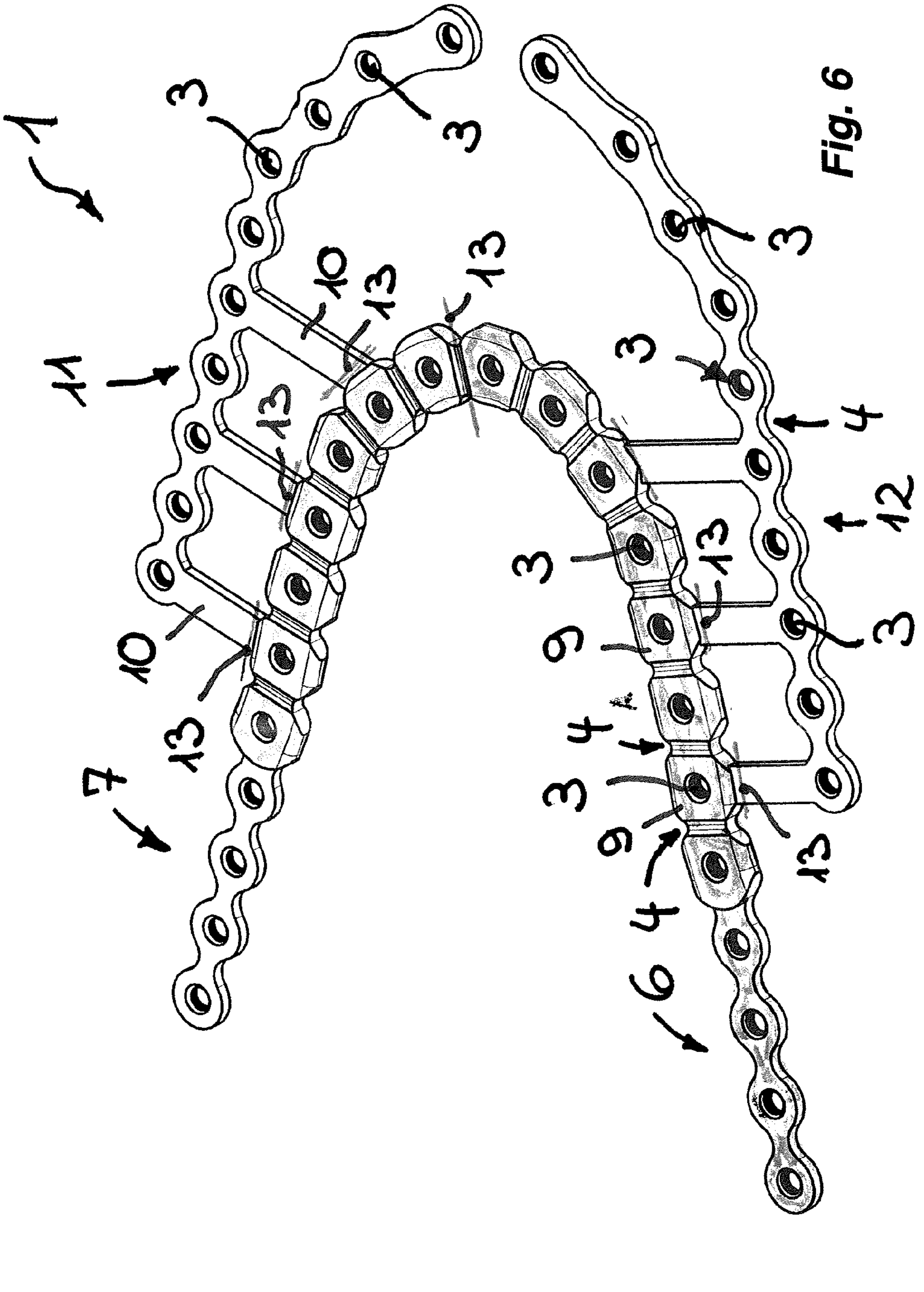

In FIG. 6 it is indicated by short cutting lines 13 how the prefabricated jaw implant 1 of FIGS. 1 to 3 can be shortened and deformed to the state in FIG. 5, cut to length and adapted to the individual conditions in the jaw of the patient.

Figures 7, 8:
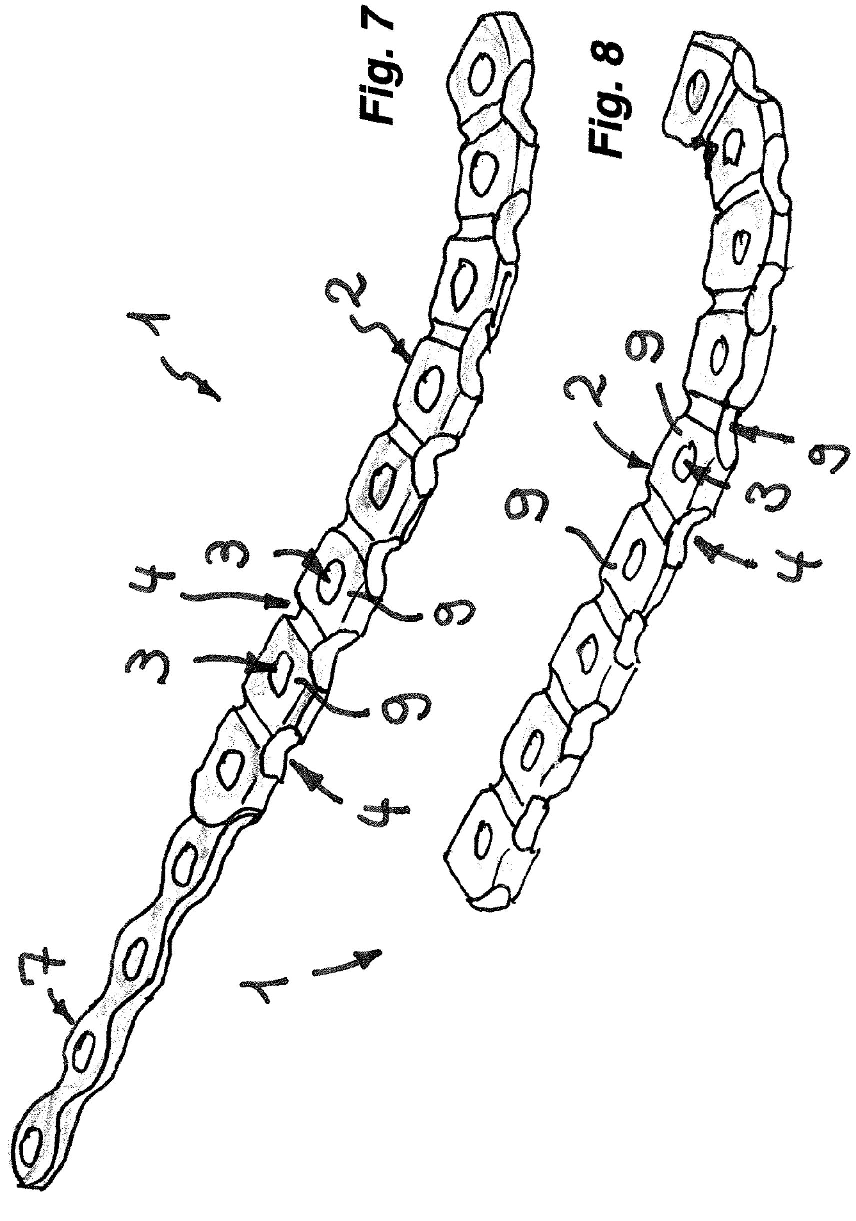

In FIGS. 7 and 8 it is shown that the interior first hole strip 2 of the prefabricated jaw implant 1 shown in FIGS. 1 to 3 can also be separated in order to use a corresponding partial piece of this interior first hole strip 2 for the mounting of a dental prosthesis. At least some of the fixing holes 3 provided in the region of the cross-sectional widenings 9 can also receive fastening screws, not otherwise shown, which are anchored in the jaw bone by their thread shaft extending beyond the corresponding partial piece of the hole strip 2.

Figure 9:
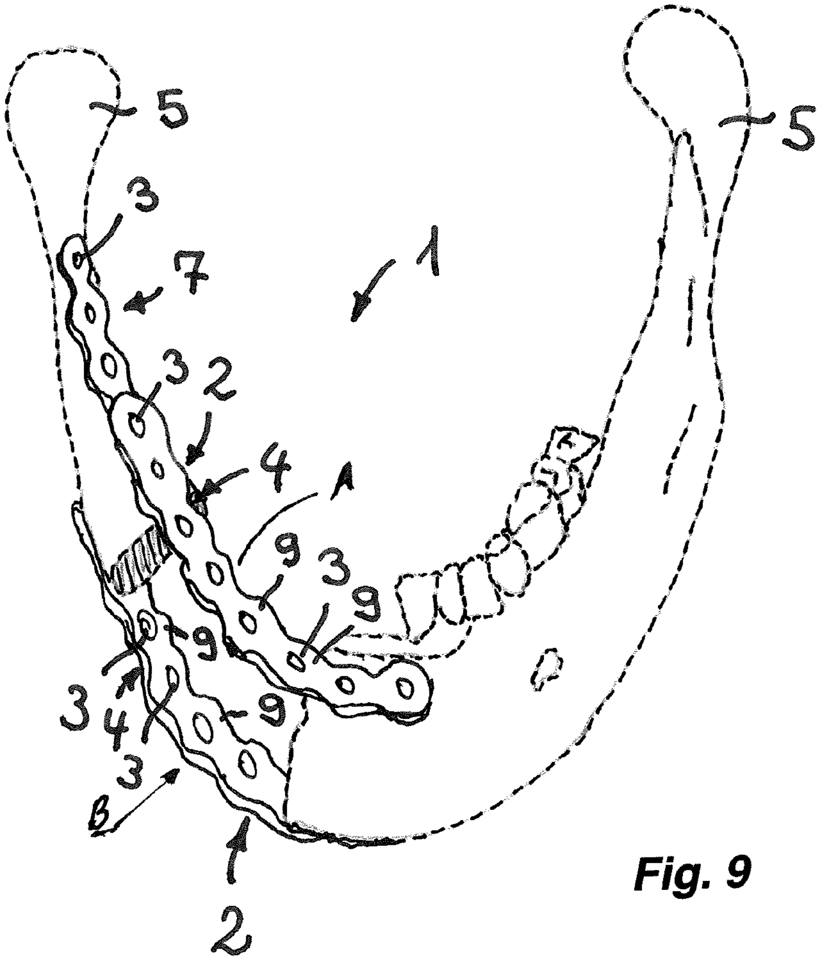

In FIG. 9 it is shown that the partial pieces of the interior first hole strip that were separated in FIGS. 7 and 8 can also be used to bridge a gap in the row of teeth and possibly also in the underlying jaw bone in a permanent manner.

Figure 10:
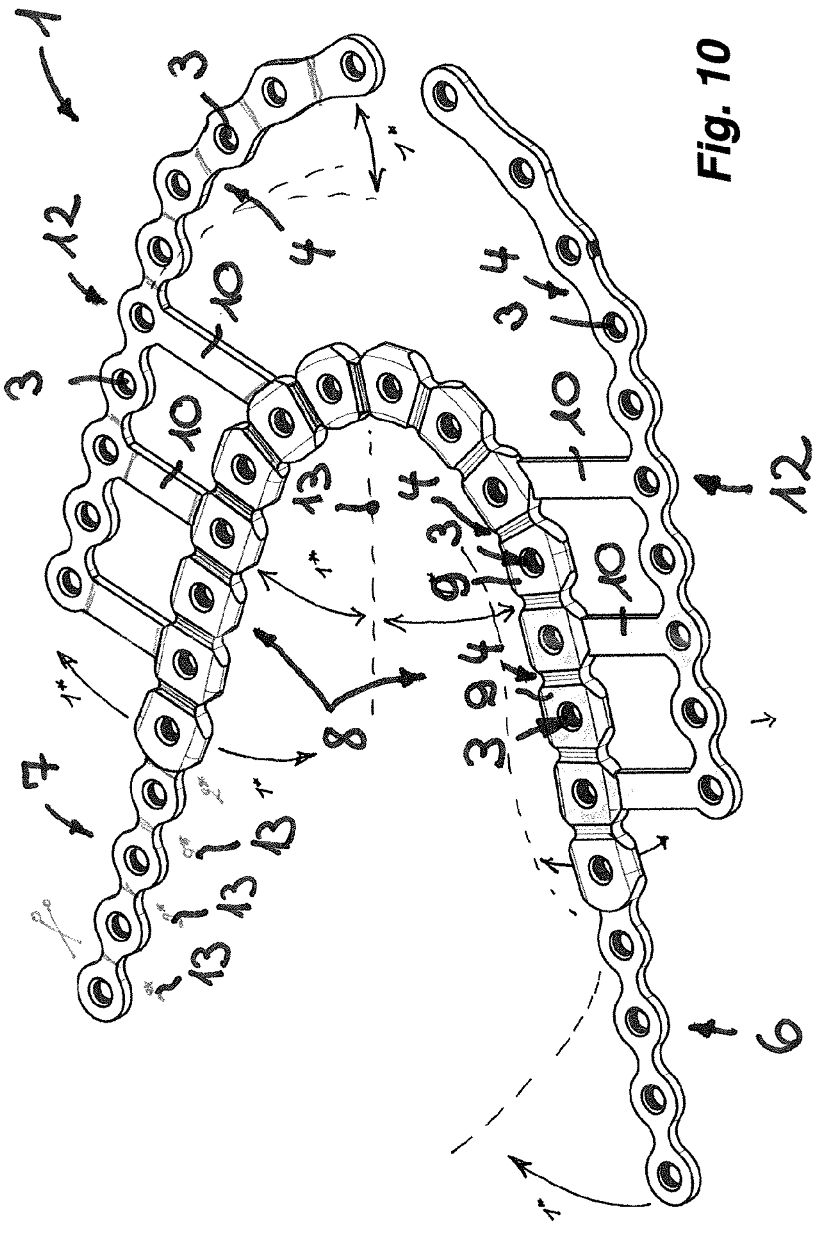

In FIG. 10 it is illustrated by dashed cutting lines 13 that the prefabricated jaw implant 1 of FIGS. 1 and 3 can be individually cut to length and shortened. Curved arrows indicate that the hole strips 2, 11, 12 of the jaw implant shown in FIG. 10 can be bent down and deformed especially at the cross-sectional weaknesses 4 so that the shape of this jaw implant can be well adapted to the circumstances in the jaw of a patient.

Figure 11:
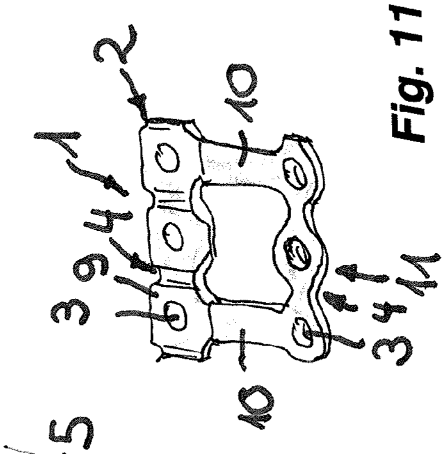
Figure 12:
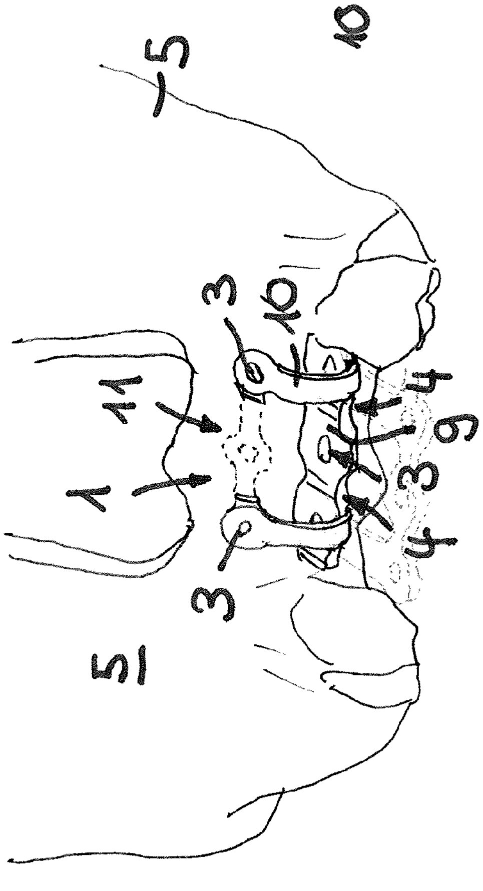
Figure 13:
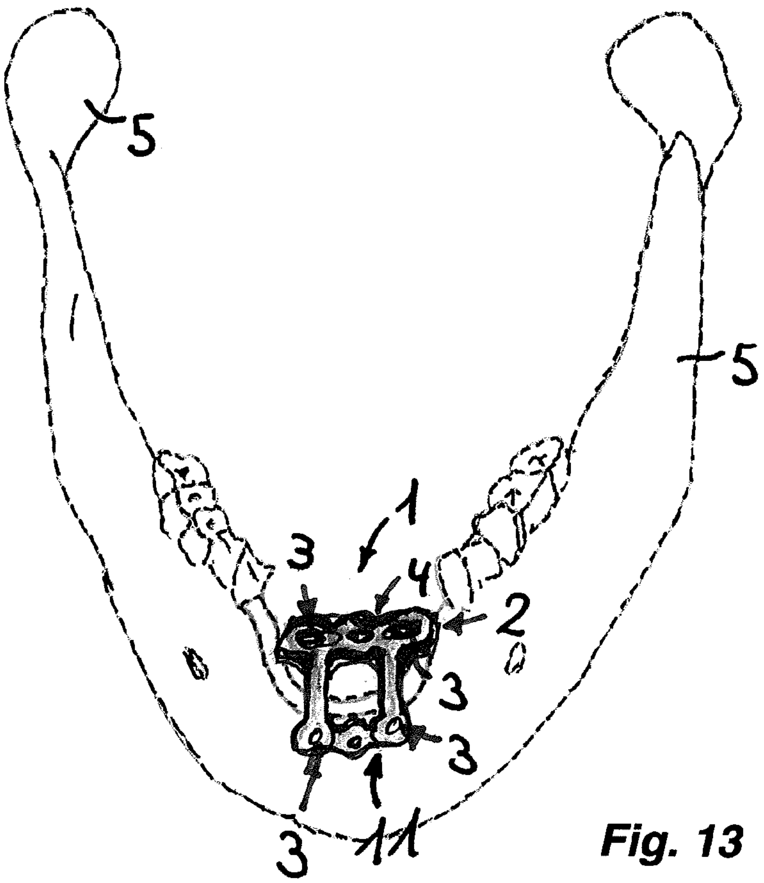

From a joint consideration of FIGS. 11 to 13 it becomes clear that a partial piece of the interior first hole strip 2 cut out from the prefabricated jaw implant of FIGS. 1 to 3 as well as one of the exterior second hole strips can be cut to length and bent so that this partial piece of the jaw implant 1 bridges a gap in the jaw bone and in the row of teeth situated above it. The hole strips 2, 11, 12 of the jaw implant represented here can thus be easily separated from each other, so that also only partial pieces of the jaw implant can be implanted. Constrictions are formed here by the link chain-shaped outer contour of the hole strips 2, 11, 12 and by the waist-like cross-sectional weaknesses 4 provided between the fixing holes 3, at which the hole strips 2, 11, 12 can be separated, cut to length, and/or deformed. Partial pieces of the prefabricated jaw implant 1 can be used in tooth-bearing regions as a sufficiently stable retroplate.

LIST OF REFERENCE NUMBERS

1 Jaw implant
2 Interior first hole strip
3 Fixing holes
4 Cross-sectional weaknesses
5 Jaw
6 Free end region of the interior first hole strip 2
7 Free end region of the interior first hole strip 2
8 Partial (middle) region 8 of the first hole strip 2 situated at a distance from the free ends 6, 7
9 Cross-sectional widenings

10 Connection webs
11 Exterior second hole strip
12 Exterior second hole strip
13 Cutting lines

The invention claimed is:

1. A jaw implant, comprising:

an interior first U-shaped hole strip comprising free end regions and a partial region disposed between the free end regions;

the interior first U-shaped strip further comprising fixing holes spaced apart from one another and cross-sectional indentations between adjacent fixing holes enes of the fixing holes in each of the free end regions and the partial region;

each said fixing hole in the partial region includes an internal screw thread for fixing a dental prosthesis, and the partial region is adapted to bridge a gap in a row of teeth in a jaw;

the partial region comprising cross-sectional widenings between adjacent cross-sectional indentions of the cross-sectional indentations which increases an axial extension of the fixing holes in an axial direction relative to the fixing holes in the free end regions;

at least one exterior second strip, which is joined by connection webs to the interior first U-shaped strip comprising fixing holes spaced apart from one another, and cross-sectional indentations between adjacent fixing holes of the fixing holes on the at least one exterior second strip; and the connection webs are deformable, such that the interior first U-shaped strip is adapted to be mounted on a jaw ridge, while the at least one exterior second strip is adapted to be fastened to an adjacent outer flank of the jaw.

2. The jaw implant as claimed in claim 1, wherein at least one of the free end regions or the at least one exterior second strip has a link chain- shaped outer contour including a bulging situated in a region of each said fixing hole between adjacent cross-sectional indentations of the cross-sectional indentations.

3. The jaw implant as claimed in claim 1, wherein the cross-sectional widenings have a non-round outer contour.

4. The jaw implant as claimed in claim 1, wherein each of the fixing holes provided at the free end regions of the interior first U-shaped strip include an internal screw thread and are configured for the fastening of the first hole U-shaped strip to the jaw.

5. The jaw implant as claimed in claim 1, wherein the at least one exterior second strip is adapted to a shape of the interior first hele U-shaped strip.

6. The jaw implant as claimed in claim 1, wherein the jaw implant is made from metal.

7. The jaw implant as claimed in claim 1, wherein the jaw implant is made from reinforced plastic.

8. A method for treatment of a jaw having at least one gap in a region of teeth, the method comprising:

providing the jaw implant as claimed in claim 1;

cutting the jaw implant along at least one of the cross-sectional indentations of the inter interior U-shaped strip or exterior second strip to adapt a length of the jaw implant to fit over the at least one gap; and in a following step mounting the jaw implant on so as the jaw implant bridges that at least one gap and further mounting the dental prosthesis on the jaw implant so as the jaw implant bridges the at least one gap.

* * * * *